United States Patent
Seo et al.

(10) Patent No.: US 8,041,345 B2
(45) Date of Patent: Oct. 18, 2011

(54) METHOD AND APPARATUS FOR DETERMINING RECONNECTION TIME POINT FOR PACKET SERVICE

(75) Inventors: Jong-Won Seo, Seoul (KR); Ho-Joong Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 879 days.

(21) Appl. No.: 11/786,742

(22) Filed: Apr. 12, 2007

(65) Prior Publication Data

US 2007/0249354 A1    Oct. 25, 2007

(30) Foreign Application Priority Data

Apr. 12, 2006    (KR) .................. 10-2006-0033285

(51) Int. Cl.
*H04M 3/42* (2006.01)
(52) U.S. Cl. ............ 455/414.1; 455/458; 455/465; 455/432.1; 455/422.1; 370/390; 370/328; 370/389; 370/337
(58) Field of Classification Search .......... 370/331, 370/328, 389, 337, 522, 329; 455/426, 436, 455/403, 433, 434, 435, 561, 414
See application file for complete search history.

(56) References Cited

U.S. PATENT DOCUMENTS

| | | | | |
|---|---|---|---|---|
| 5,448,569 A * | 9/1995 | Huang et al. | ................. | 370/332 |
| 5,987,099 A * | 11/1999 | O'Neill et al. | ................. | 455/436 |
| 6,810,263 B1 * | 10/2004 | Cheng et al. | ................. | 455/510 |
| 7,257,419 B2 * | 8/2007 | Hunzinger | ................. | 455/510 |
| 2002/0068586 A1* | 6/2002 | Chun et al. | ................. | 455/458 |
| 2003/0003912 A1* | 1/2003 | Melpignano et al. | ........ | 455/436 |
| 2003/0134636 A1* | 7/2003 | Sundar et al. | ................. | 455/432 |
| 2003/0134650 A1* | 7/2003 | Sundar et al. | ................. | 455/465 |
| 2004/0005883 A1* | 1/2004 | Lee | ................. | 455/422.1 |
| 2004/0203780 A1* | 10/2004 | Julka et al. | ................. | 455/436 |
| 2004/0266435 A1* | 12/2004 | de Jong et al. | ................. | 455/436 |
| 2005/0197124 A1* | 9/2005 | Kang et al. | ................. | 455/439 |
| 2006/0274750 A1* | 12/2006 | Babbar et al. | ................. | 370/390 |

* cited by examiner

*Primary Examiner* — Nick Corsaro
*Assistant Examiner* — Mahendra Patel
(74) *Attorney, Agent, or Firm* — The Farrell Law Firm, P.C.

(57) ABSTRACT

Disclosed is a method and apparatus for determining a reconnection time point for a packet service according to a handover environment during the packet service. To this end, a multi-mode terminal checks the service quality of a network, and performs reconnection for a packet service by determining a current time point as a handover time point only when the service quality of the network meets a handover condition at the current time point. Therefore, the multi-mode terminal is provided with a packet service from a network which provides relatively superior quality of service.

13 Claims, 4 Drawing Sheets

METHOD AND APPARATUS FOR DETERMINING RECONNECTION TIME POINT FOR PACKET SERVICE

PRIORITY

This application claims the benefit under 35 U.S.C. 119(a) of an application entitled "Method And Apparatus For Determining Reconnection Time Point For Packet Service" filed in the Korean Intellectual Property Office on Apr. 12, 2006 and assigned Serial No. 2006-33285, the contents of which are incorporated herein by reference.

BACKGROUND OF THE INVENTION

1. Field of the Invention

The present invention relates to a multi-mode terminal, and more particularly to a method and apparatus for determining a reconnection time point for a packet service in a multi-mode terminal which provides two distinct mobile communication schemes.

2. Description of the Related Art

Currently, mobile communication technology is evolving from the Code Division Multiple Access (CDMA) and European GSM (Global System for Mobile communication) systems, which are $2^{nd}$ generation network systems, into a $3^{rd}$ generation network system, such as a Wideband CDMA (WCDMA) system. Since there is a vast and well-equipped service area using the $2^{nd}$ generation communication scheme, the service area using the $3^{rd}$ generation communication scheme is being extended even broader while the base facility for the $2^{nd}$ generation communication scheme is being utilized, during this time of transition. Therefore, a terminal designed to receive a service specified in the $3^{rd}$ generation network during transition is produced as a multi-mode terminal, which can support the existing $2^{nd}$ generation communication scheme in addition to the $3^{rd}$ generation communication scheme.

Such multi-mode terminals include an idle handover function for performing a mode transition between a WCDMA mode and a CDMA mode in an idle state, a traffic handover function for performing a mode transition to a CDMA mode without discontinuance of communication when the terminal enters a shadow area from a WCDMA network during communication, and a packet call reconnection function for performing a mode transition to accomplish reconnection when a handover occurs in a mode of receiving a packet-type data call. These functions are economical since they utilize the existing CDMA network in the $2^{nd}$ generation system, but have a disadvantage of needing complicated hardware and software of the terminal, due to the need for quick handover between different modems.

The operation of a terminal performing the packet call reconnection function will now be described with reference to FIG. 1, which illustrates an area in which general CDMA and WCDMA network systems are established. The area having the CDMA and WCDMA network systems is divided into a dedicated CDMA service area and an overlapping service area in which both CDMA and WCDMA services are supportable.

When operating in a WCDMA mode, the multi-mode terminal 10 receives an IP address, which is required for a packet service, from a WCDMA base station in a WCDMA network area (i.e., an overlapping service area 30), and is provided with a packet service (PS). Thereafter, when moving into a dedicated CDMA service area 20 through a boundary area, the multi-mode terminal 10 receives a system parameter message representing a handover instruction from a CDMA based station. When such a handover environment occurs, the packet service becomes disconnected in order to provide a corresponding service, so that the multi-mode terminal 10 performs reconnection to a packet call in order to continuously use the previous packet service. Therefore, the multi-mode terminal 10 performs reconnection for a packet service call with the CDMA base station, to which the terminal is handed over, and then ends the packet service call with a WCDMA base station.

In addition, when the multi-mode terminal 10 is located in a weak electric field area, which corresponds to an oblique-line region 40, the multi-mode terminal 10 unconditionally performs a handover operation to a target network according to an instruction issued from the target network, without determining the quality of the service provided from the target network and the currently-connected network. However, although a multi-mode terminal, which is located in an weak electric field area, receives a handover instruction, it is efficient for the multi-mode terminal not to perform a handover if the quality of the service provided from the network currently in use is superior to that provided from a handover target network.

As described above, according to the prior art, it is important to timely perform a handover when a handover request is received in a multi-mode terminal which performs packet communication using different mobile communication technologies (e.g. CDMA and WCDMA networks). However, the conventional multi-mode terminal unconditionally performs reconnection for a packet service according to handover instructions issued from a network, regardless of the quality of service.

SUMMARY OF THE INVENTION

Accordingly, the present invention proposes a method and apparatus for determining a reconnection time point for a packet service in a multi-mode terminal supporting at least two different mobile communication schemes, so as to efficiently perform a handover.

To this end, in accordance with the present invention, there is provided a method for determining a reconnection time point for a packet service in a multi-mode terminal, which includes a first communication-network module and a second communication-network module, the method including monitoring quality of a signal provided from a first communication network while a packet service is being performed through the first communication network, determining whether the monitored signal quality is less than or equal to a threshold value which represents a shadow area, and determining a handover when the signal quality is maintained less than or equal to the threshold value, during at least a first time reference interval, and performing reconnection for the packet service to a second communication network.

In accordance with the present invention, there is provided an apparatus for determining a reconnection time point for a packet service in a multi-mode terminal, which includes a first communication-network module and a second communication-network module, the apparatus including the first communication-network module for monitoring quality of a signal provided from a first communication network while a packet service is being performed through the first communication network, determining whether the monitored signal quality is less than or equal to a threshold value which represents a shadow area, and determining a handover when the signal quality is maintained less than or equal to the threshold value, during at least a first time reference interval, thereby performing reconnection for the packet service to a second communication network by switching on a power of the second communication-network module, and the second communication-network module for performing a connection to a packet service call through the second communication network according to an instruction of the first communication-network module, thereby performing the packet service.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
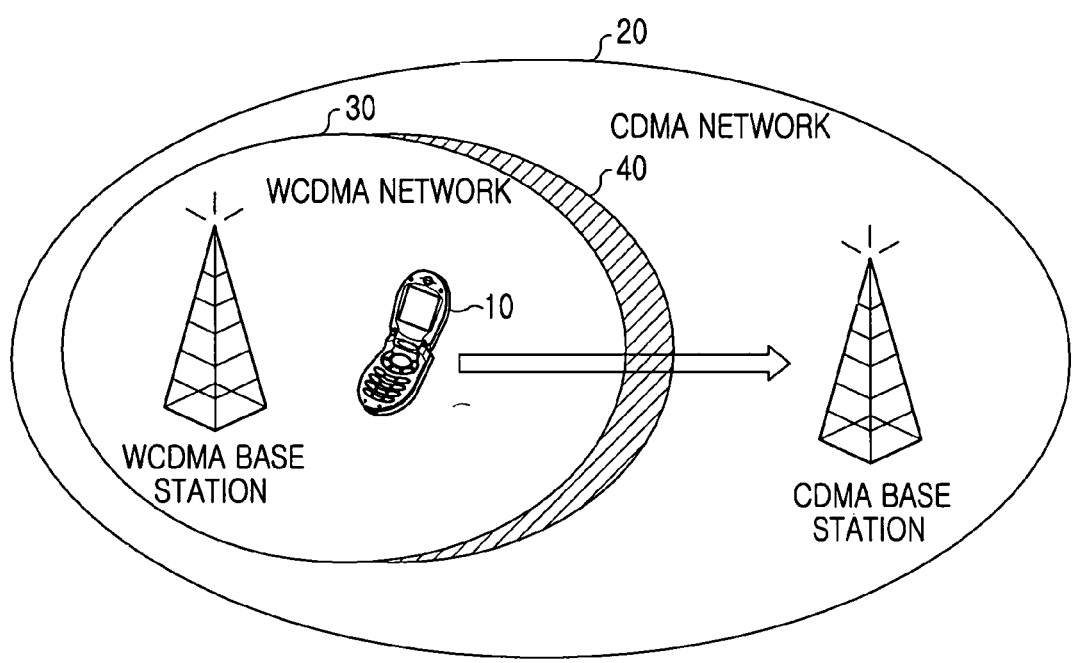
FIG. 1 is a view illustrating an area in which conventional CDMA and WCDMA network systems co-exist.

Hereinafter, preferred embodiments of the present invention will be described with reference to the accompanying drawings. It is to be noted that the same elements are indicated with the same reference numerals throughout the drawings. In the following description, a detailed description of known functions and configurations incorporated herein will be omitted for the sake of clarity and conciseness.

The present invention discloses a function for determining a reconnection time point for a packet service according to a handover environment when providing the packet service. To this end, a multi-mode terminal checks the service quality of a network, and performs reconnection for a packet service by determining performance of a handover time point only when the service quality of the network meets a predetermined handover condition. In addition, items, which serve as criteria for a packet service handover of a multi-mode terminal, may be provided from a network. That is, the multi-mode terminal can determine a handover based on a threshold value or time sent from a network. Accordingly, the multi-mode terminal can be provided with a packet service from a network which provides relatively superior quality of service.

Figure 2:
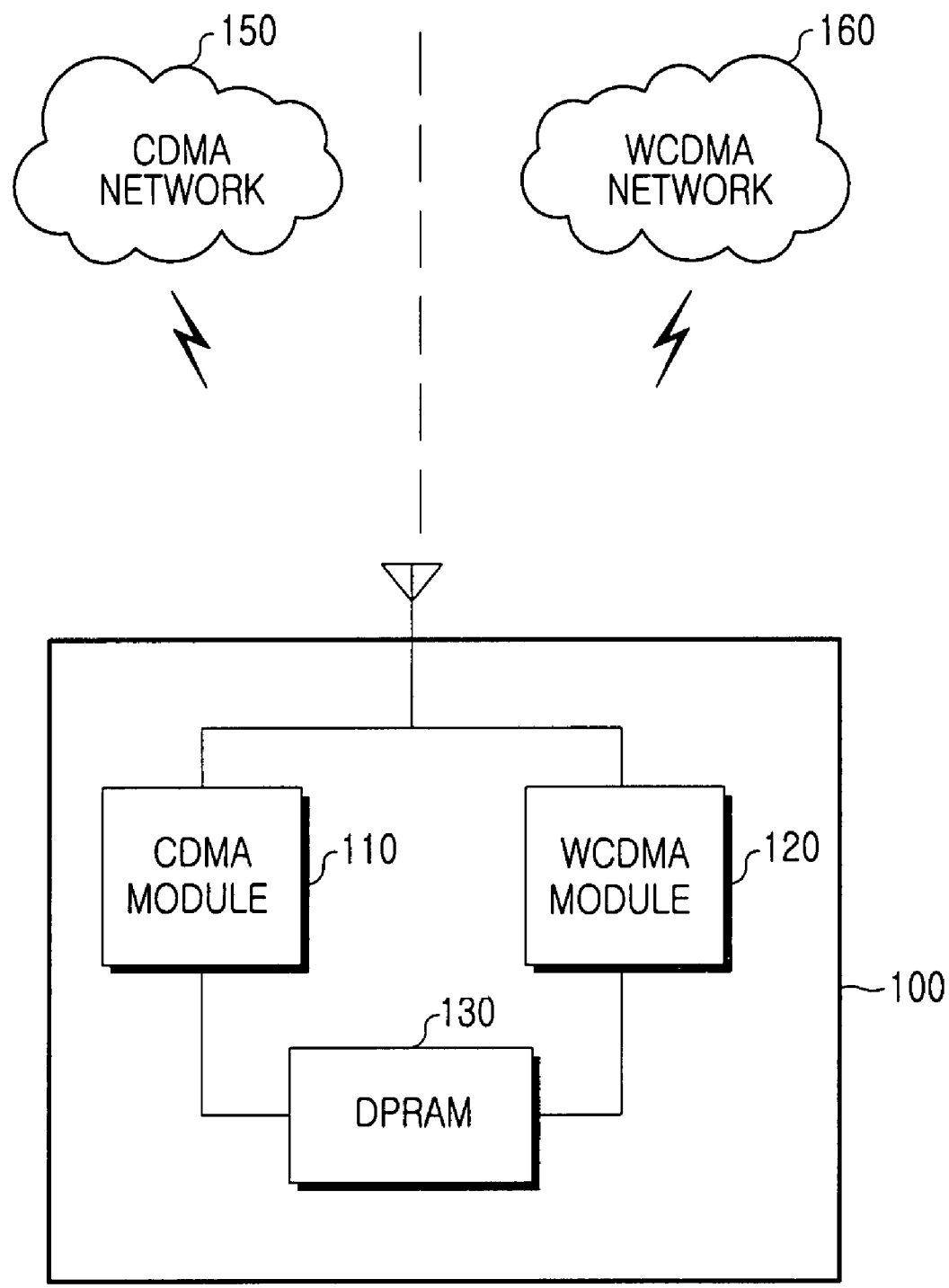
FIG. 2 is a block diagram illustrating the construction of a multi-mode terminal according to the present invention.

FIG. 2 is a block diagram illustrating the construction of a multi-mode terminal according to the present invention. The following description will be given with respect to CDMA and WCDMA networks as an example of different mobile communication technologies, particularly, with respect to a handover from a WCDMA mode to a CDMA mode. Herein, the multi-mode terminal according to the present invention refers to a terminal capable of being applied to any two different mobile communication technologies from among CDMA/Evolution-data Optimized (CDMA/EVDO), WCDMA, General Packet Radio Service (GPRS), Korean Wireless Broadband Access Service (WiBro), Wireless Broadband Access Service (WiMax), and Wireless Fidelity (WIFI).

According to the present invention, the multi-mode terminal includes, for example, a WCDMA module 120 and a CDMA module 110 so as to perform operations according to corresponding modes, as shown in FIG. 2. Each module includes a corresponding modem and a radio frequency (RF) unit. The multi-mode terminal uses modem chips supporting different mobile communication services depending on the modes. The modules 110 and 120 are individually connected to a Dual Port Random Access Memory (DPRAM) 130 through a hardware communication path. FIG. 2 illustrates the construction of a multi-mode terminal which has a single antenna structure. Therefore, when the multi-mode terminal having the above-mentioned construction is located within a WCDMA network, only the CDMA module 110 is temporarily powered off, and an antenna and the WCDMA module 120 are powered on, so that the multi-mode terminal operates in a WCDMA mode. Conversely, when the multi-mode terminal is located within a CDMA network, only the WCDMA module 120 is temporarily powered off, and an antenna and the CDMA module 110 are powered on, so that the multi-mode terminal operates in a CDMA mode.

Meanwhile, since the multi-mode terminal includes only two modules 110 and 120, which do not have an application processor, either of the modules must act as a master. Generally, when the WCDMA module 120 acts as a master, the WCDMA module 120 may also serve as a user interface, which has been typically implemented by an application processor. In this case, the CDMA module 110 operates under the control of the WCDMA module 120 which is a master module. Each module 110 or 120 functions to connect a packet service of a corresponding network 150 or 160, and functions to receive data to be output through a screen from a corresponding network 150 or 160 or to transmit data input by the user. That is, the modules 110 and 120 perform data communication, such as browsing for a packet service, downloading and video on-demand (VoD).

Herein, the modules 110 and 120 may be integrated in a single modem chip. In this case, since the multi-mode terminal uses the single modem chip, the multi-mode terminal can operate by selectively activating or deactivating the CDMA module 110 and WCDMA module 120 as needed. In this case, the DPRAM 130 and the hardware communication path are not required.

Meanwhile, after being activated, the modules 110 and 120 continuously monitor the quality of a signal provided from a currently-connected network, in which the signal quality is determined based on a pilot signal power "$E_c/I_o$" in the case of CDMA. In contrast, in the case of WCDMA, the signal quality is determined based on the pilot signal power "$E_c/I_o$" and a received signal code power (RSCP). Therefore, a module (e.g., WCDMA module 120), which acts as a master, determines that a handover is necessary when a signal quality measured by the WCDMA module 120 is less than or equal to a threshold value.

Meanwhile, a packet service provided through the modules 110 and 120 is executed by an application prepared in the multi-mode terminal. Such an application may be downloaded through a browser from a network so as to be prepared in the multi-mode terminal in advance, or may be received either as an application for execution of contents from a content service provider or in a server providing a content service. Such an application can provide a packet-type service such as a VoD service. When a service is provided in a WCDMA mode, the application processes data received through the WCDMA module 120 so as to provide a corresponding service.

When a handover occurs, the multi-mode terminal 100 must select one internal module while being handed over to a corresponding network. To this end, the application regulates network sources, which have been required for communication through the WCDMA module 120, in order to achieve a handover. That is, the application closes a socket, which is a connection path to transmit a service between the WCDMA module 120 and the WCDMA network 160. Thereafter, the application connects a call through the CDMA module 110, creates a new socket suitable for a newly-connected CDMA network and continues to perform a service. Although the above description is given concerning the case in which a handover is performed from a WCDMA network to a CDMA network, the same manner may be applied to the converse case in which a handover is performed from a CDMA network to a WCDMA network.

A procedure for determining a reconnection time point for a packet service according to a first embodiment of the present invention will now be described with reference to FIG. 3.

First, the following description will be given concerning a case in which the multi-mode terminal 100 operates in a WCDMA mode. Herein, the "operating in the WCDMA mode" indicates a state in which a packet-type path (e.g., packet bearer) is established by using an IP address or a port, which are allocated for the packet service, after the WCDMA module 120 requests a packet service according to a user's request.

Figure 3:
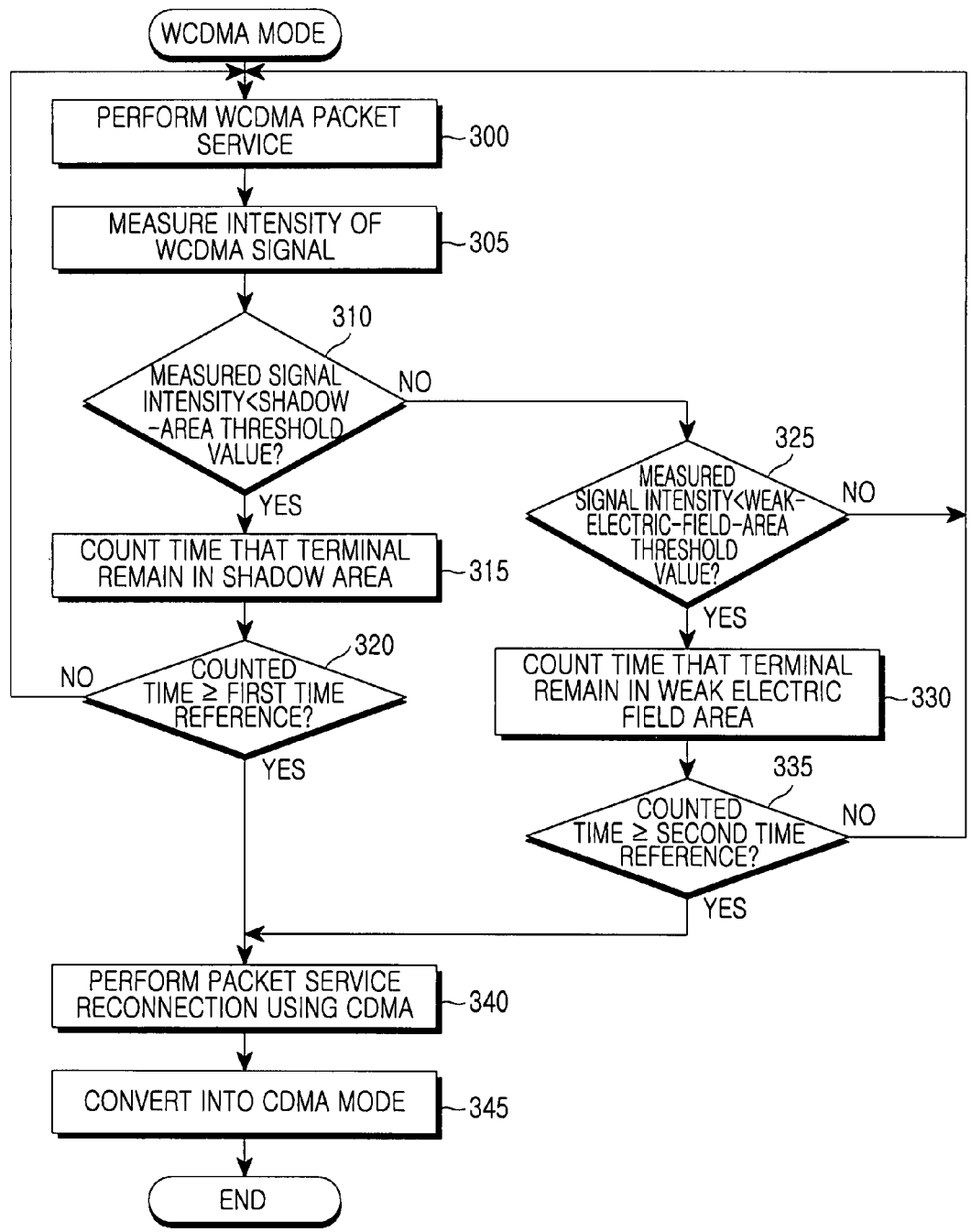
FIG. 3 is a flowchart illustrating a procedure for determining a reconnection time point for a packet service according to a first embodiment of the present invention.

In FIG. 3, it is assumed that, in the WCDMA mode, the multi-mode terminal 100 operates under the control of the WCDMA module 120. In step 300, the multi-mode terminal 100 receives data from the WCDMA network 160 by using an allocated IP address so as to perform a packet service. During such a packet service, the multi-mode terminal 100 monitors the sufficiency of the quality of a signal provided from the currently-connected network to determine whether the handover is required.

According to a first embodiment of the present invention, when it is determined that either a received signal code power (RSCP) or pilot signal power is less than or equal to a threshold value, or that both a received signal code power and a pilot signal power are less than or equal to corresponding threshold values, respectively, the corresponding time point is determined as a handover time point to perform reconnection for a packet service. In this case, since such a measured signal intensity may be lowered only for an instant, the present invention proposes to perform reconnection for a packet service only when a signal intensity which is less than or equal to a threshold value is continuously measured during at least a time interval. In addition, items, which serve as criteria for a packet service handover of the multi-mode terminal, may be provided from a network. That is, the multi-mode terminal may determine whether it is necessary to perform a handover based on a threshold value and/or a time interval.

Meanwhile, a handover can occur when the multi-mode terminal moves into a boundary area of a corresponding network or into a weak electric field area, or when the multi-mode terminal moves into a non-service area, i.e., a shadow area, in which the multi-mode terminal cannot receive a signal from the corresponding network.

In step 310, the multi-mode terminal 100 determines whether a measured signal intensity is less than or equal to a shadow-area threshold value. When it is determined that the measured signal intensity is less than or equal to the shadow-area threshold value, the multi-mode terminal 100 starts to count time in step 315 to measure a time period during which the multi-mode terminal remains in the shadow area. Then, the multi-mode terminal determines whether the counted time is greater than or equal to a first time reference interval in step 320. This time is counted in order to quickly reconnect a packet service to a connectable network, except for when no signal is received only for an instant, because the shadow area corresponds to a non-service area. Therefore, the first time reference interval for determining whether the multi-mode terminal is located within a shadow area is less than a time reference interval for determining whether the multi-mode terminal is located within a weak electric field area.

When it is determined as a result of step 320 that the counted time is less than the first time reference interval, the multi-mode terminal returns to step 300 to repeat the aforementioned steps. When it is determined as a result of step 320 that the counted time is greater than or equal to the first time reference interval, that is, when a signal intensity which is less than or equal to the shadow-area threshold value is continuously measured during at least the first time reference interval, the multi-mode terminal proceeds to step 340. In step 340, the multi-mode terminal performs reconnection for the packet service to the CDMA, and then proceeds to step 345 of performing a mode transition to the CDMA mode.

The operation of the multi-mode terminal in steps 340 and 345, which is the same as the operation of a typical multi-mode terminal performing reconnection for a packet service, will now be described in more detail. When a handover occurs, the WCDMA module 120 switches on the power of the CDMA module 110, and is continuously provided with a service from the WCDMA network 160 until it is determined that a packet service has been connected through the CDMA module 110. Thereafter, when it is determined that the CDMA module 110 can receive the packet service, the WCDMA module 120 ends connection to the WCDMA network 160, and the CDMA module 110 acts as a master to receive the service from the CDMA network 250. In this case, the WCDMA module 120 is powered off, or enters a low power state.

Generally, a module acting as a slave is powered off, or is set to a low power state. According to the above description, it is not until reconnection for a packet service is performed that a handover target module is powered on. However, if a handover target module is powered on in advance, upon the connection of a packet service call, it is possible to reduce a time period required for reconnection of a packet service. In addition, if the CDMA module 110 and the WCDMA module 120 are integrated in a single modem chip, it is possible to use a required module only by activating the required module in the modem chip, which has been switched on, because an operation of switching on or off the modem chip is not required. Generally, a typical handover target module requires a large time period, which includes an activating time period, a time period for registration with a network, a connection time period, etc., when performing reconnection for a packet service. However, according to the first embodiment of the present invention, a handover target module waits in a low power state, in order to significantly reduce the activating and registration time periods.

For example, when the multi-mode terminal 100 enters an underground parking lot or the like, it becomes nearly impossible for the multi-mode terminal 100 to receive a signal from the WCDMA network 160. In this case, a received signal code power and a pilot signal power are measured as values which are lower than those measured in a weak electric field area. Therefore, it is necessary to immediately perform a mode transition to a CDMA mode. In addition, since such a shadow area is a non-service area, the multi-mode terminal determines that a handover is to be immediately performed so as to quickly perform reconnection for the packet service to a different network, when a received signal code power, a pilot signal power, or both are continuously measured as a value which is equal to or less than the shadow-area threshold value during at least a first time reference interval.

Meanwhile, when the signal intensity measured in step 310 is greater than the shadow-area threshold value, the multi-mode terminal 100 proceeds to step 325 to determine whether the measured signal intensity is less than or equal to a weak-electric-field threshold value. Herein, the term "weak-electric-field threshold value" refers to a reference value in which a screen distortion phenomenon is caused during a packet service, and the weak-electric-field threshold value is greater than the shadow-area threshold value. When it is determined as a result of step 325 that the measured signal intensity is less than or equal to the weak-electric-field threshold value, the multi-mode terminal 100 goes to step 330 in which it counts a time period during which the multi-mode terminal remains in the weak electric field area. Thereafter, the multi-mode terminal 100 determines whether the counted time period is greater than or equal to a second time reference interval (step 335). When it is determined a result of step 335 that the counted time period is less than the second time reference interval, the multi-mode terminal 100 returns to step 300 so as to repeatedly measure the intensity of a signal. In contrast, when a signal intensity which is less than or equal to the weak-electric-field threshold value is measured continuously during at least the second time reference interval, the multi-mode terminal 100 proceeds to step 340 so as to perform reconnection for the packet service. That is, when a signal intensity which is less than or equal to the weak-electric-field threshold value is received continuously during a at least a time period, the multi-mode terminal determines that the multi-mode terminal is located in a weak electric field area, and therefore, that it is time to perform a handover.

For example, when the multi-mode terminal is located at an entrance of an underground parking lot while receiving a packet service from the WCDMA network 160, the signal received from the WCDMA network 160 to the multi-mode terminal becomes weak. Accordingly, a data loss occurs, so that a screen, through which a service is provided, is distorted. According to the first embodiment of the present invention, the multi-mode terminal checks the quality of a signal provided from a currently-connected network so as to receive a service from a network which provides a better quality of service. In this case, the CDMA module 110 has been powered off or has been set to a low power mode. In such an weak electric field, a received signal code power and a pilot signal power generally have low values, so that the multi-mode terminal 100 can measure the intensity of a received signal. Although a received signal code power and a pilot signal power have similar properties, it is not enough to use only one of the two conditions as the condition for determination of the quality of a signal because the two conditions may represent different states based on the weak-electric-field threshold value. In such a network environment, although it is possible to receive voice or a packet service, a voice disconnection or screen distortion phenomenon may occur. Therefore, in order to receive a service from a network which provides a better signal quality, the multi-mode terminal uses the above conditions for determination of signal quality so as to determine whether a handover environment occurs and to determine a reconnection time point for a packet service.

Meanwhile, although the above description is described for when a handover occurs during a WCDMA packet service, a handover may occur while a voice-based communication service and a packet service are simultaneously performed.

Figure 4:
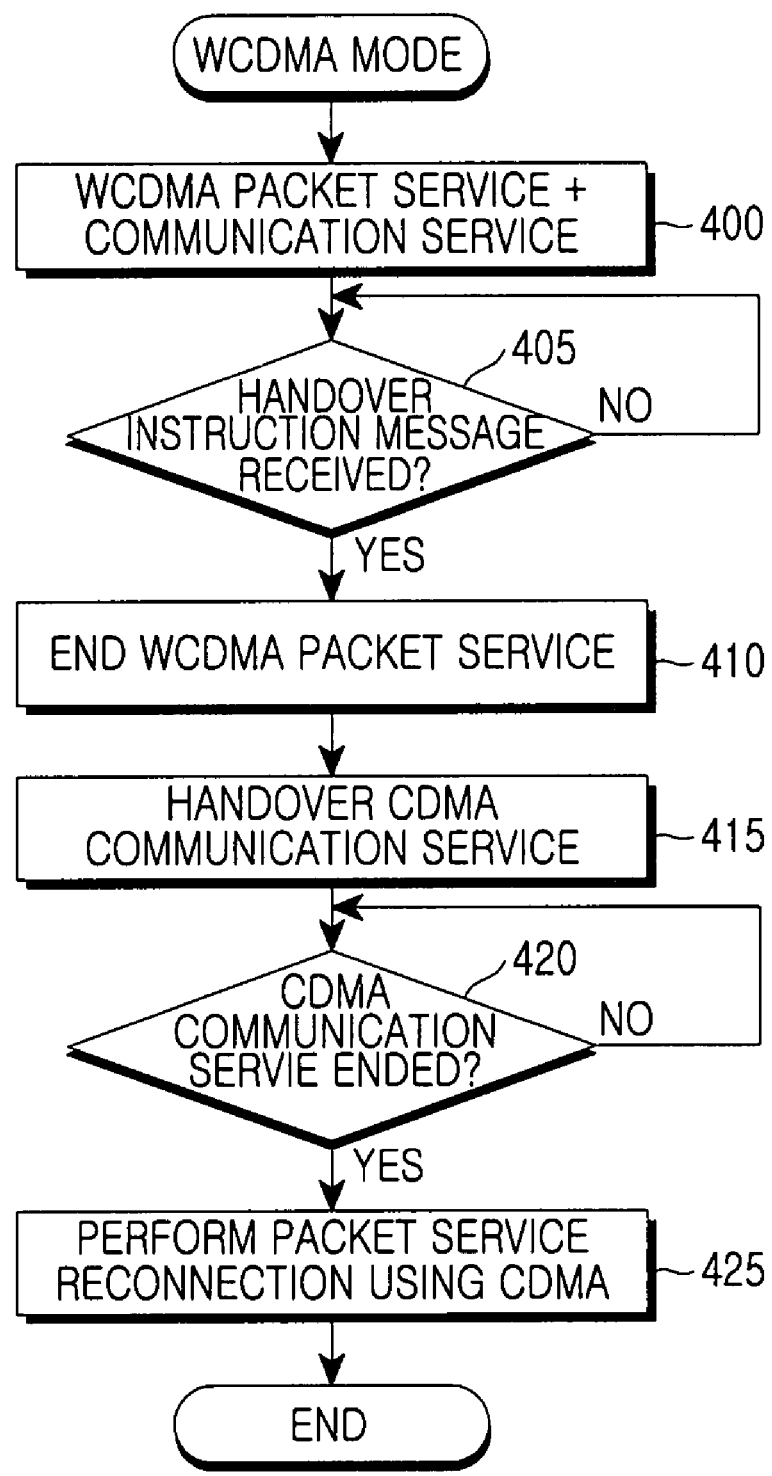
FIG. 4 is a flowchart illustrating a procedure for determining a reconnection time point for a packet service according to a second embodiment of the present invention.

Accordingly, FIG. 4 is a flowchart illustrating the procedure for determining a reconnection time point for a packet service according to a second embodiment of the present invention.

When a voice call and a packet service call are simultaneously connected, a communication service and a WCDMA packet service and are simultaneously performed in step 400. Generally, when communication is made in a WCDMA mode, the WCDMA module 120 switches on the CDMA module 110, so that the CDMA module 110 is switched on and waits in a low power mode. Thereafter, the WCDMA module 120 determines whether a handover instruction message is received from the WCDMA network 160 in step 405. When receiving a handover instruction message according to occurrence of a handover environment, the WCDMA module 120 activates the CDMA module 110.

Then, the WCDMA module 120 ends the WCDMA packet service in step 410, and instructs the CDMA module 110 to perform a handover to a CDMA communication service (step 415). Thus, the CDMA module 110 enters a service mode in order to find a network for a handover. Thereafter, the WCDMA module 120 determines whether a CDMA communication service has ended (step 420). When it is determined in step 420 that the CDMA communication service has ended, step 425 is performed to reconnect the packet service to the CDMA. When it is possible to perform a voice handover from WCDMA to CDMA, reconnection for a packet service can be performed by using the CDMA module 110 as it is, because the CDMA module 110 is already operating in a service mode in which power is supplied. Therefore, it is possible to perform reconnection at a faster speed, as compared to when the CDMA module 110 is not powered on until the multi-mode terminal enters a shadow area.

As described above, the present invention provides an improved algorithm for processing a handover between different types of systems, so that it is possible to provide an improved quality of service to the user in a boundary area between, a shadow area of, and an overlapping area of the different types of systems when a multi-mode terminal performs a packet service. The present invention also has an advantage in that the multi-mode terminal itself can select an optimum service mode.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for determining a reconnection time point for a packet service in a multi-mode terminal, which includes a first communication-network module and a second communication-network module, the method comprising the steps of:

monitoring quality of a signal provided from a first communication network while a packet service is being performed through the first communication network;

determining whether the monitored signal quality is less than or equal to a threshold value which represents a shadow area; and determining a handover time when the signal quality is less than or equal to the threshold value, during at least a first time reference interval, and if the signal quality is less than or equal to the threshold value for a period greater than the first time reference interval, performing reconnection for the packet service to a second communication network, wherein the monitoring and both determining steps are performed by the first communication-network module in the multi-mode terminal.

2. The method as claimed in claim 1, further comprising:
determining whether the signal quality is less than or equal to a threshold value which represents a weak electric field area; and
determining a handover time when the signal quality is less than or equal to the threshold value, during at least a second time reference interval, and performing reconnection for the packet service to a second communication network.

3. The method as claimed in claim 1, wherein the first time reference interval is less than a time reference interval of a weak electric field area, the threshold value representing the shadow area refers to a reference value for determining whether the multi-mode terminal is located in the shadow area, and the threshold value representing the shadow area is less than a threshold value representing the weak electric field area.

4. The method as claimed in claim 2, wherein the second time reference interval is greater than a time reference interval of a shadow area, and the threshold value representing the weak electric field area is greater than a threshold value representing the shadow area.

5. The method as claimed in claim 1, wherein the signal quality is determined based on any one of a pilot signal power and a received signal code power.

6. The method as claimed in claim 1, wherein the handover time is determined based on one of when a received signal code power is less than or equal to a threshold value which represents the shadow area, when a pilot signal power is less than or equal to a threshold value which represents the shadow area, and when both the received signal code power and the pilot signal power are less than or equal to corresponding threshold values which represent the shadow area.

7. The method as claimed in claim 1, wherein the first and second communication networks correspond to two different mobile communication networks, which are selected from among Code Division Multiple Access/Evolution-data Optimized (CDMA/EVDO), Wideband CDMA (WCDMA), General Packet Radio Service (GPRS), Korean Wireless Broadband Access Service (WiBro), Wireless Broadband Access Service (WiMax), and Wireless Fidelity (WIFI).

8. The method as claimed in claim 7, wherein the first and second communication-network modules correspond to a modem for processing signals transmitted/received through the first and second communication networks, respectively.

9. The method as claimed in claim 1, further comprising:
performing a handover for a voice call communication service to the second communication network, when a handover instruction message is received while the voice call communication service is being performed together with a packet service through the first communication network;
determining whether the handed-over voice call communication service has ended; and
performing reconnection for a packet service to the second communication network by determining the hand-over when the voice call communication service has ended.

10. An apparatus for determining a reconnection time point for a packet service in a multi-mode terminal, which includes a first communication-network module and a second communication-network module, the apparatus comprising:
the first communication-network module for monitoring quality of a signal provided from a first communication network while a packet service is being performed through the first communication network, determining whether the monitored signal quality is less than or equal to a threshold value which represents a shadow area, and determining a handover time when the signal quality is less than or equal to the threshold value, during at least a first time reference interval, and if the signal quality is less than or equal to the threshold value for a period greater than the first time reference interval, performing reconnection for the packet service to a second communication network by switching on a power of the second communication-network module; and
the second communication-network module for performing a connection to a packet service call through the second communication network according to an instruction of the first communication-network module, thereby performing the packet service.

11. The apparatus as claimed in claim 10, wherein the first communication-network module determines whether the monitored signal quality is less than or equal to a threshold value representing an weak electric field area, and determines a handover time when the signal quality is less than or equal to the threshold value, during at least a second time reference interval, thereby performing reconnection for the packet service to a second communication network.

12. The apparatus as claimed in claim 10, wherein the signal quality is determined based on any one of a pilot signal power and a received signal code power.

13. The apparatus as claimed in claim 10, wherein the first and second communication networks correspond to two different mobile communication networks, which are selected from among Code Division Multiple Access/Evolution-data Optimized (CDMA/EVDO), Wideband CDMA (WCDMA), General Packet Radio Service (GPRS), Korean Wireless Broadband Access Service (WiBro), Wireless Broadband Access Service (WiMax), and Wireless Fidelity (WIFI).

* * * * *